C. F. HOPEWELL.
TIRE CASE.
APPLICATION FILED JUNE 21, 1912.
1,037,482.
Patented Sept. 3, 1912.
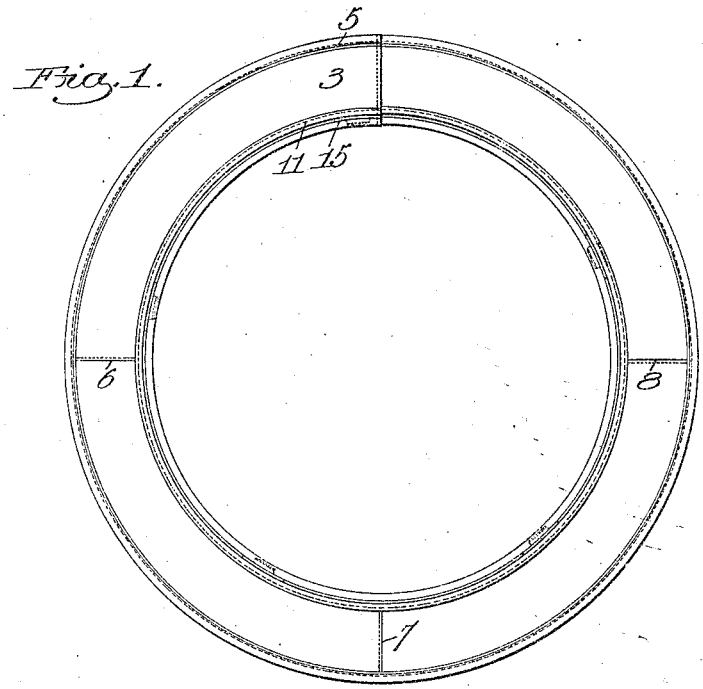
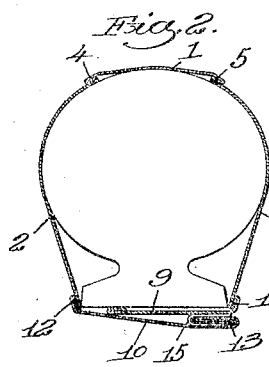
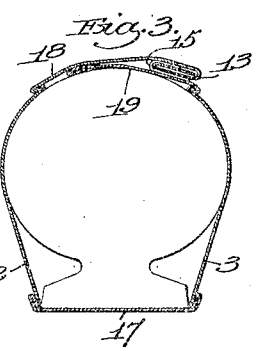
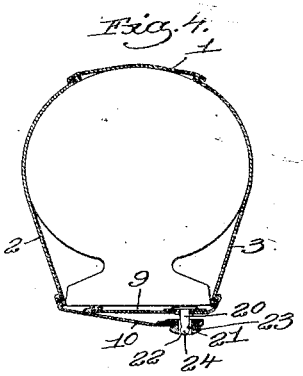
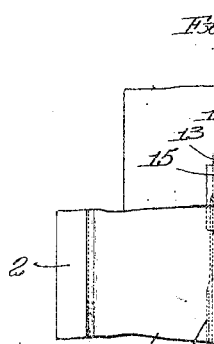
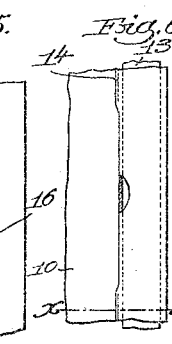
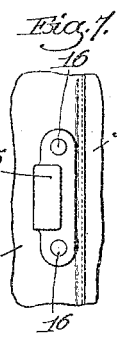
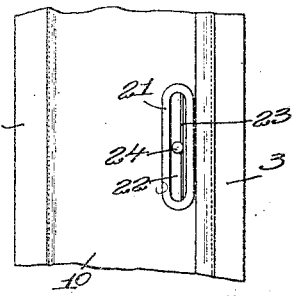
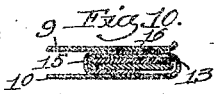

UNITED STATES PATENT OFFICE.

CHARLES F. HOPEWELL, OF NEWTON, MASSACHUSETTS.

TIRE-CASE.

1,037,482.  Specification of Letters Patent.  Patented Sept. 3, 1912.

Application filed June 21, 1912. Serial No. 704,947.

*To all whom it may concern:*

Be it known that I, CHARLES F. HOPE-WELL, a citizen of the United States, residing at Newton, county of Middlesex, State of Massachusetts, have invented an Improvement in Tire-Cases, of which the following description, in connection with the accompanying drawing, is a specification, like characters on the drawing representing like parts.

This invention relates to a tire case such as employed for enveloping and protecting a spare tire such as carried and used on automobiles. Such tire cases are commonly made of some suitable fabric and when in position on the tire are annular in form. Such tire cases are also commonly made up of separate strips or sections of material. There may be, for example, long straight strips to cover or fit against the bead or tread of the tire and strips of circular shape to fit against the flange and sides of the tire. Either or all of these strips may be made up in sections, the sections of the circular side strips being in that case arc shaped. The tire case is then produced usually by stitching together the various sections into the complete case. The case is then left open at one edge, usually at the bead or at the tread of the tire, and the entire case is usually separated at these ends. In putting the case in place it is fitted over the tire, the ends fastened together by suitable fastening means and the overlapping longitudinal edges are likewise fastened together. In making up such a tire case it is practically impossible to secure or stitch the various sections together with mathematical exactness, and as a consequence and by reason of the peculiar shape of the completed case, it is practically impossible so to locate the complemental members of the fastening devices that when the tire case is in place and the fastening members are brought together there will be an exact fit.

It is the object of this invention to provide such a tire case with securing or fastening means so constructed and arranged that the tire case may be fastened in place and fit smoothly and evenly, presenting a satisfactory and pleasing appearance on the tire.

The nature of the invention will appear more fully from the accompanying description and drawings and will be particularly pointed out in the appended claims.

The drawings represent preferred forms of tire case embodying this invention.

In the drawings—Figure 1 is a side elevation of a tire case in place. Fig 2 is a cross section of such a tire case where the edges overlap and are secured together at the bead. Fig. 3 is a view similar to Fig. 2 of a tire case where the edges overlap and are secured together at the tread. Fig. 4 is a view similar to Fig. 2 in which a different type of securing or fastening device is employed. Fig. 5 is a plan view partially in cross section of the construction shown in Fig. 2. Fig. 6 is a plan view of the inner surface of the overlying edge shown in Fig. 5. Fig. 7 is a plan view of the outer surface of the inner edge of the construction shown in Fig. 5. Fig. 8 is a bottom plan view of the construction shown in Fig. 4. Fig. 9 is a view in cross section taken on the line $x$—$x$ of Fig. 6. Fig. 10 is a cross section enlarged of a portion of Fig. 2.

In the figures of drawings it has not been attempted to show the parts in their precise proportions, and especially the parts where the fastening devices occur have usually been considerably exaggerated for purposes of illustration.

The tire cases as illustrated in the drawings may be made of suitable material, preferably water-proof or water-repellent, and composed of several pieces united or stitched together to form an elongated strip of a shape adapted, when its ends are brought together and fastened, to embrace and wrap the annular tire. As shown in Figs. 1, 2, 5, 6, 7, 9 and 10, this tire case comprises a tread strip 1, consisting of a long straight parallel edge strip designed to fit against the generally cylindrical tread surface of the tire. It also comprises concentric circular edged flange strips 2 and 3 united at their convex edges to the edges of the tread strip by lines of stitching indicated at 4 and 5 respectively. It is obviously impractical to cut these flange strips in continuous pieces, and hence they are usually formed in arc shaped sections stitched together at their ends as indicated at 6, 7 and 8. The tire case also comprises in the form shown bead strips 9 and 10 at each edge of the case, the bead strip 9, for example, being secured by a line of stitching 11 to the concave edge of the flange strip 3, and the bead strip 10 being secured by a line of stitching 12 to the concave edge of the flange strip 2. These strips or flaps fit against and cover the bead portion of the tire and the one overlaps the other as shown. It is also desirable to provide the free edge of the overlying strip or flap, as 10, with a resilient stiffener member, which serves to hold this free edge of the overlying flap snugly against the incased tire. Such a stiffener member is shown as a flat piece of spring steel at 13. This may be secured in place by inturning the free edge of the strip or flap 10 about the member 13, and stitching the inturned portion to the main part of the flap as indicated at 14.

As stated above, it is practically impossible to stitch together the various strips at their ends and at their edges with such accuracy, and so to locate complemental fastener members that when the tire case is placed and fastened on the tire it will fit smoothly and without puckering.

This invention provides complemental fastener members secured respectively to the overlying flaps at suitable intervals and permitting variation in the engagement of said complemental members longitudinally of said flaps so that while holding the edges together in fixed relation transversely, there may be such a variation or adjustment in the longitudinal position of engagement thereof, as to secure the desired results and enable the tire case to fit snugly and smoothly and present the desired pleasing appearance. As one means for securing this end the construction illustrated in the figures of the drawings referred to, namely 1, 2, 5, 6, 7, 9 and 10, may be employed. In this case a plurality of fastener members disposed at suitable intervals longitudinally of the case are employed. Each fastener member comprises two complemental parts or members. One member consists of a flat metal hook 15 riveted in place as indicated at 16 to the underlying flap 9 with the hook projecting downwardly and outwardly. The other complemental member is provided with the metallic strip 13, and to enable the engagement of the hook therewith the stitching 14 is omitted at intervals as clearly shown in Figs. 5 and 6, for a distance considerably greater than the length of the hook 15. It will thus be seen that the hook 15 may be snapped into place and while securely holding the flaps together transversely, will permit of a longitudinal variation, adjustment or engagement of the complemental members.

A similar construction is illustrated in Fig. 3 except that in this case the bead portion is constituted as a single strip 17 stitched to the concave edges of the flange strips 2 and 3, while the tread is covered by two overlapping strips 18 and 19 respectively secured to the convex edges of the flange strips 2 and 3. In this case the hook shaped complemental member 15 of the fastener device is riveted to the underlying tread strip 19 and the metallic strip 13 is secured in the free edge of the overlying tread strip 18 by stitching in a manner similar to that already described.

It may not be necessary to form the strip 13 in one continuous section and it is not necessary to do so in so far as its function as a complemental part of the fastener device is concerned. Neither is it necessary that this strip should be of any particular cross section or material, so long as it properly coöperates with the hook member 15, or when used as a stiffener member for the edge, so long as it properly secures that result.

Other means of construction of the fastener members may be employed to secure the advantages and results of this invention, and one other form is suggested and illustrated in Figs. 4 and 8 of the drawings, wherein the tire case is shown, so far as the fabric material portion thereof is concerned, as constructed in the same manner as described in connection with the first form illustrated in Figs. 1, 2, 5, 6, 7, 9 and 10. In the form illustrated in Figs. 4 and 8 each fastener member is shown as composed of a stud and socket. The stud 20 is riveted or secured to the underlying strip, as the bead strip 9, in the usual manner. The socket member 21 is riveted or secured to the overlying bead strip 10 and is provided with an elongated slot 22 and an elongated engaging rod 23. The socket member has the usual ball head 24 with a recess therebeneath, so that when the stud is snapped through the opening 22, this recess will catch on the rod 23 which springs or yields aside for that purpose, and then snaps back into the recess. It will thus be seen that this form of fastener member secures the same results as those already set forth and as desired, namely, holding the tire case firmly together transversely and allowing the necessary longitudinal variation, adjustment or engagement of the edges.

The number of fastener members employed may be varied, and any suitable means may be employed for securing together the ends of the tire case.

The cost of manufacture of the tire case is materially reduced by the employment of this invention, especially in the first or preferred form, owing to the simplicity and inexpensive type of fastener member, the utilization of the edge stiffener as a complementary fastener member, and the saving of time heretofore taken in locating the complementary fastener members in an endeavor to secure a properly fitting case.

Having fully described my invention, what I claim as new and desire to secure by Letters Patent is:—

1. An annular tire case presenting overlapping longitudinal flaps, complemental fastener members secured at intervals to said flaps, each pair of fastener members having an engagement in fixed position transversely of and in variable position longitudinally of said flaps, whereby the edges of the tire case are secured in fixed position transversely and allowed to adjust themselves longitudinally into proper position.

2. An annular tire case composed of straight and segmental strips secured together and presenting overlapping longitudinal flaps, one flap presenting a hem or pocket longitudinally thereof, a resilient stiffener member located in said hem or pocket, a plurality of hooks secured to the opposite flap and adapted when the case is in position on the tire to engage said stiffener member, whereby the edges of the tire case are secured in fixed position transversely and allowed to adjust themselves longitudinally into proper position.

In testimony whereof, I have signed my name to this specification, in the presence of two subscribing witnesses.

CHARLES F. HOPEWELL.

Witnesses:
ALICE G. NIXON,
FREDERICK S. GREENLEAF.